UNITED STATES PATENT OFFICE.

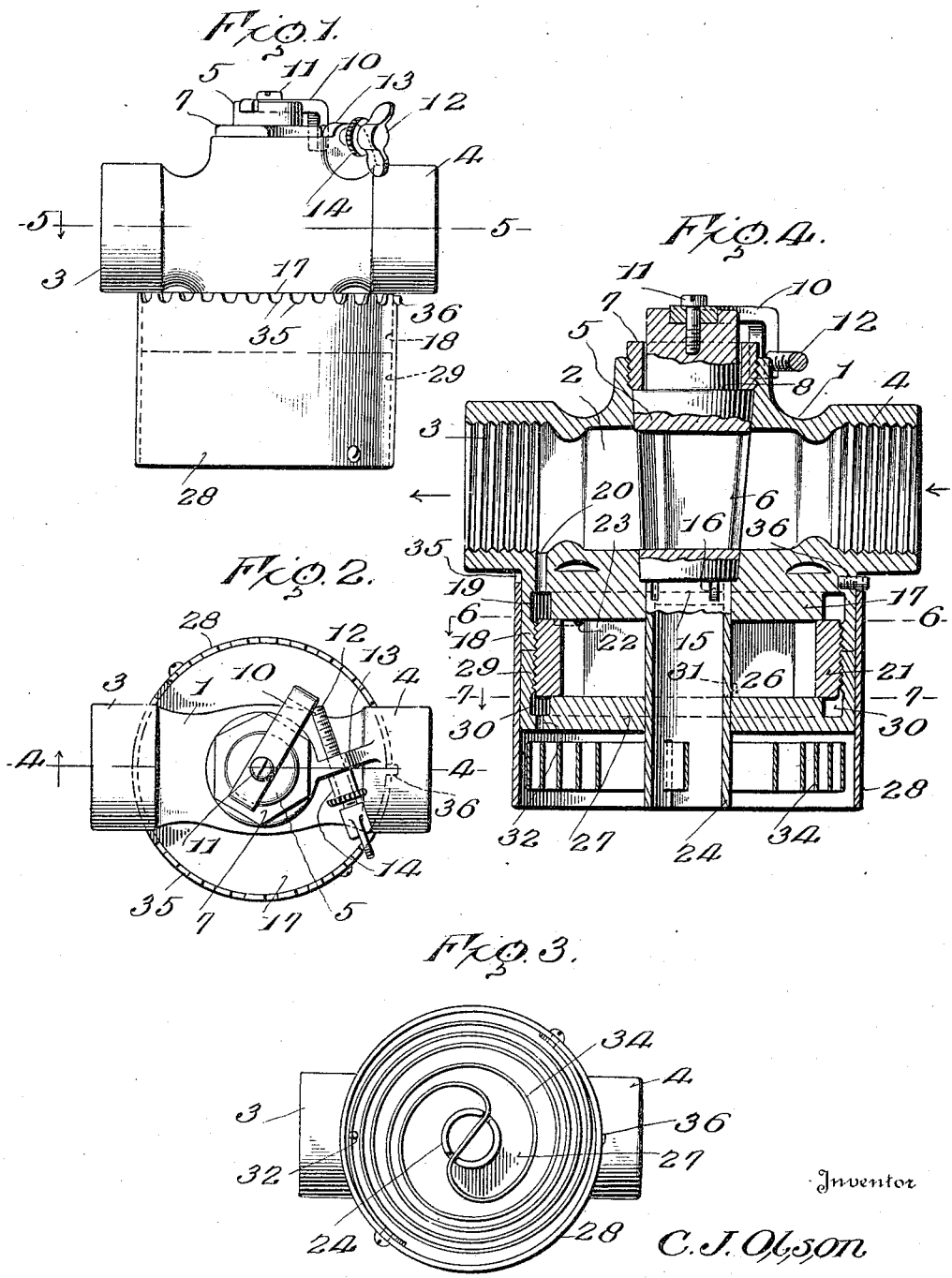

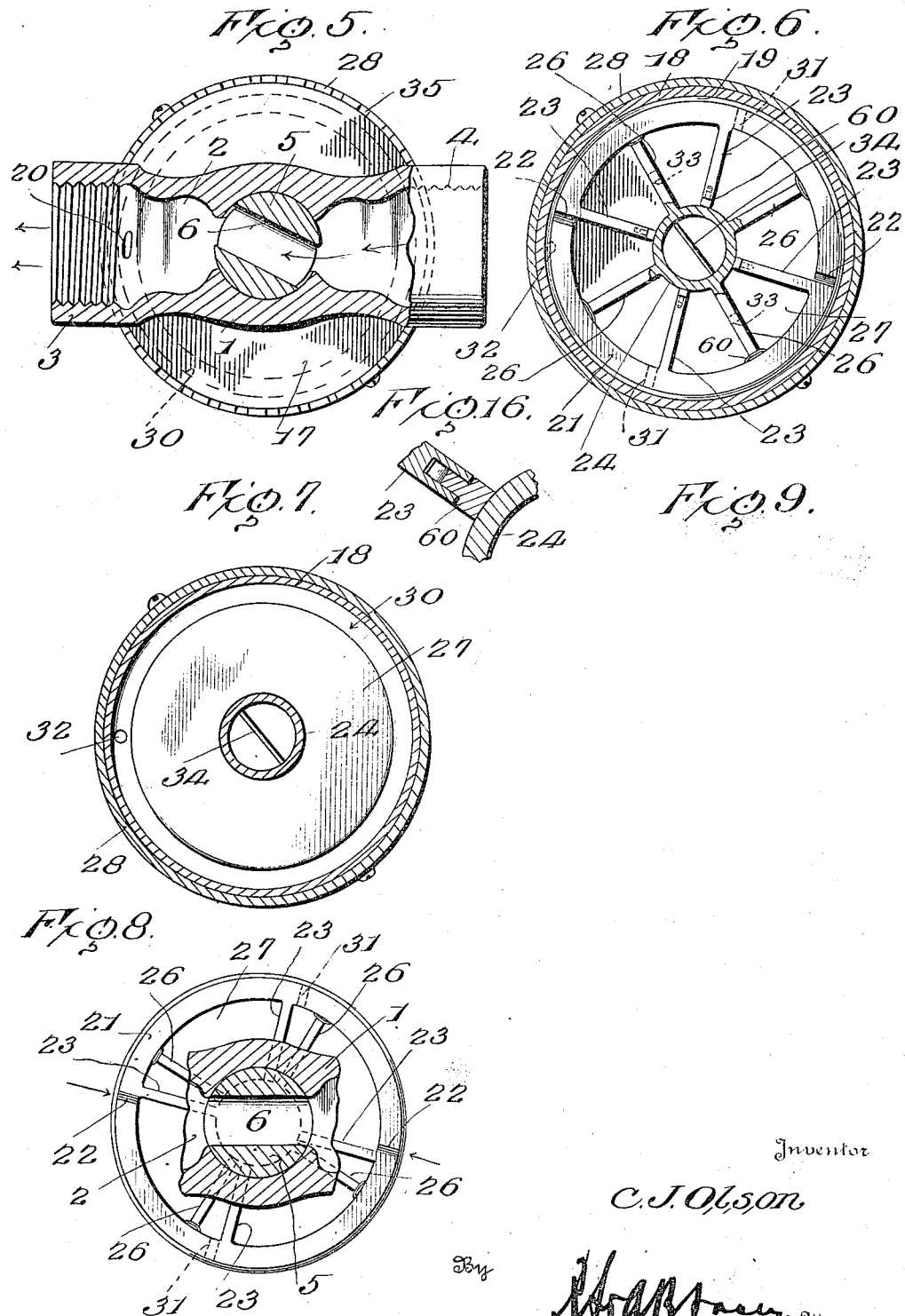

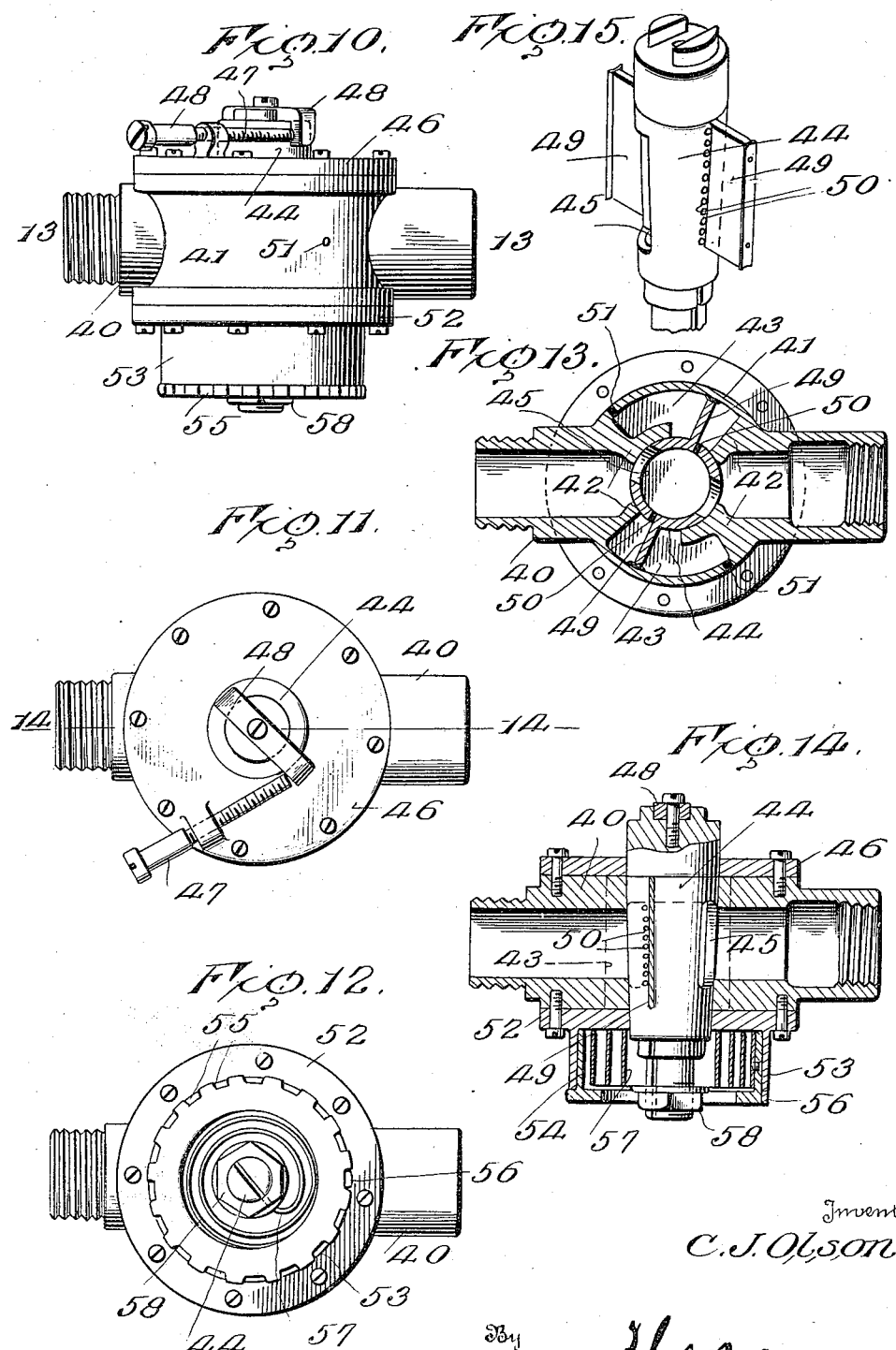

CHARLES J. OLSON, OF MUSKEGON, MICHIGAN.

GOVERNOR-VALVE.

1,293,895.　　　Specification of Letters Patent.　　Patented Feb. 11, 1919.

Application filed January 23, 1918. Serial No. 213,373.

*To all whom it may concern:*

Be it known that I, CHARLES J. OLSON, a citizen of the United States, residing at Muskegon, in the county of Muskegon and State of Michigan, have invented certain new and useful Improvements in Governor-Valves, of which the following is a specification.

This invention relates to valves and has for its object the provision of means whereby the flow of a fluid pressure medium through a pipe or passage will be automatically regulated according to variations in the load or pressure.

The invention is illustrated in the accompanying drawings and will be hereinafter fully described, the novel features being subsequently particularly pointed out in the appended claims.

In the drawings,—

Figure 1 is a side elevation of a valve embodying my invention;

Fig. 2 is a plan view of the same;

Fig. 3 is a bottom plan view thereof;

Fig. 4 is an enlarged longitudinal section on the line 4—4 of Fig. 2;

Fig. 5 is a horizontal section on the line 5—5 of Fig. 1;

Fig. 6 is a horizontal section on the line 6—6 of Fig. 4;

Fig. 7 is a horizontal section on the line 7—7 of Fig. 4;

Fig. 8 is a view with parts in horizontal section and parts in plan showing a different adjustment from that shown in Fig. 5;

Fig. 9 is a detail perspective view of the valve plug and the governor vanes;

Fig. 10 is a side elevation of a different form of the valve;

Fig. 11 is a plan view of the same;

Fig. 12 is a bottom plan view thereof;

Fig. 13 is a horizontal section on the line 13—13 of Fig. 10;

Fig. 14 is a longitudinal section on the line 14—14 of Fig. 11;

Fig. 15 is a detail perspective view of the valve plug and governor vanes shown in Fig. 14.

The valve casing 1 is formed with a diametrical bore 2 therethrough and at diametrically opposite points is provided with internally threaded nipples 3 and 4 to facilitate its interposition in and connection with a pipe for conveying steam, air or other fluid under pressure. Intermediate the nipples 3 and 4 in the top and bottom of the casing are openings which receive and form bearings for a tapered valve plug 5 having a port 6 extending diametrically therethrough, flow through the valve casing being permitted more or less accordingly as the port is turned to extend across the bore of the valve casing, or aline with the same, or assume an intermediate position, as will be understood. A retaining collar 7 is threaded into the opening in the top of the casing and bears upon the annular shoulder 8 on the plug to retain the plug in the casing while in the upper extremity of the plug is a recess or groove 9 in which is secured one end of a stop arm or lever 10 by means of a screw 11 or its equivalent, the free end of said lever or arm being turned down into the path of an adjusting screw 12 which is mounted in a bearing 13 on the valve casing and is held in a set position by a lock nut 14. The lower extremity of the plug is reduced, as shown at 15, and has teats or projections 16 on the reduced portion.

On the under side of the valve casing is an annular enlargement 17 which is constructed with an internally threaded rim 18 which depends below its lower face in which is an annular groove 19, a port 20 leading from the bore of the casing into said groove. A ring 21 is fitted within and has threaded engagement with the rim 18 whereby the upper edge of the ring will be secured against the enlargement 17 and will extend across the groove 19, said edge being provided with grooves 22 which establish communication between the annular groove 19 and the interior of the ring. Abutment blades 23 extend radially inward from the ring and terminate adjacent a post 24 which is disposed centrally in said chamber and is preferably hollow to minimize weight, and also to receive the reduced tenon 15 of the valve plug in its upper end. The upper end of the post 24 is provided with a plurality of notches 25 adapted to engage the projections 16 on the plug so that movement of either the plug or the post will always be transmitted directly to the other. Radial vanes 26 are fixed on the post below the upper end of the same and in area are approximately equal to the cross-sectional area of the chamber defined by the post and the ring 21, the vanes being disposed alternately with the abutment blades as shown clearly in Fig. 6. Upon reference to Figs. 6 and 8, it will be noted that there are four equidistant blades 23 and that the inlets 22 are disposed immediately adjacent diametrically opposite blades, there being no inlets adjacent the intermediate blades. Four chambers are thus provided, two of which are open to the pressure fluid and may be termed pressure chambers while the alternate chambers are closed to the pressure fluid and may be termed cushioning or buffer chambers. The bottom of all the chambers is defined by a disk 27 which is provided with a peripheral inclosing shell 28 the upper portion of which is adapted to fit around the rim 18, the intermediate portion of the shell being thickened and internally threaded, as shown at 29, to engage the ring 21 and abut the rim 18 whereby a close joint will be formed. In the upper side of the disk 27 is an annular channel 30 and radial grooves 31 establish communication between the pressure chambers and the annular channel while a port 32 leading downwardly through the disk forms an outlet from the channel. The buffer chambers may be filled with oil, if desired, or the contained air may be relied upon to cushion the stroke of the vanes and the vanes playing in said chambers are provided centrally with perforations 33 when oil is used to permit slow flow of the oil and thereby prevent excessive fluctuation of the vanes, and check the violent opening or closing of the valve due to variation in the pressure as the motor cuts off or increases the flow. To prevent leakage of the pressure fluid from the pressure chambers, the ends of the vanes and the blades may be equipped with packing, as indicated at 60, which may be of any approved form. The lower end of the post 24 extends below the disk 27 and a volute spring 34 is wound around the post and secured to the same and to the lower portion of the shell 28, the spring being placed under any desired tension by rotating the shell about the post and held under tension by causing one of the notches 35 in the upper edge of the shell to engage a stop or lug 36 on the valve casing, as will be readily understood.

It is thought the operation of the valve will be readily understood. To employ the valve as a governor, it is arranged between the throttle and the motor so that the pressure fluid will flow in the direction indicated by the arrows in Fig. 5. While the plug is turned so that the port extends across the casing, the throttle is opened wide after which the adjusting screw 12 is turned so as to force the arm 10 around and move the plug to a position, such as shown in Fig. 5, in which sufficient pressure will be admitted to drive the motor at the desired speed. The spring should then be adjusted so that it will just overbalance the back pressure caused by the friction of the motor and the resistance on the pistons, so that the valve will tend to stay in the set position. When the motor is working, as it takes up the load there will be an increase in back pressure, proportional to the load, which will drive the motive fluid through the port 20, groove or channel 19, and grooves 22 into the pressure chambers which it enters between the vanes and the abutment blades. The vanes will be forced to move away from the abutments by the pressure and the post will, consequently, be turned against the tension of the spring and the plug shifted to or toward the position shown in Fig. 8 so that a greater volume of the fluid will be admitted to the motor which will, therefore, be driven at a constant speed notwithstanding variations in the load. Injurious racing of the motor when the load is removed is effectually overcome by the automatic operation of the valve.

The valve may also be employed as a relief or safety valve. For this purpose, the casing is connected to the boiler so that the flow therefrom through the valve will be in the direction opposite that indicated by the arrows in Fig. 5, the spring being put under such tension as to hold the plug normally in closed position. The outlet from the boiler will then be through the port 20 to and through the pressure chambers. When the pressure rises above that indicated by the tension of the spring, it will act upon the vanes so as to turn the post and the plug toward open position and permit the excess fluid to escape until the pressure is again normal when the parts will return to their initial positions.

To operate as a reducing valve, the cap 7 is removed sufficiently to permit the plug to be lifted so as to clear the upper end of the rotary post whereupon the plug is turned so that the projections 16 will lie in a plane at an angle to that occupied in the adjustment shown in Fig. 5, bringing the plug to the open position shown in Fig. 8. When the pressure accumulates on the far side of the plug, it will turn the plug against the tension of the spring in the same direction as before but toward the closed position to cut off the flow and permit the pressure to decrease.

In Figs. 10 to 15 is illustrated a form of the device particularly adapted for use as a pressure-reducing or a safety valve. In this form of the invention, the valve casing 40 is constructed intermediate its ends with a circular enlargement 41 in which are webs 42 separating the bore of the casing from the interior of the enlargement which constitutes the pressure or governor chamber 43. The plug 44 is rotatably fitted in the casing and bridges the spaces between the webs 42 as clearly shown in Fig. 13, flow of fluid being permitted when the port 45 in the plug is in alinement with the bore of the casing and being cut off when the port extends across the bore. A cap plate 46 is secured on the top of the valve casing and an adjusting screw 47 is mounted on said plate to coöperate with a stop arm or lever 48 secured on the upper end of the plug. The vanes 49 are carried directly by the plug and perforations or minute ports 50 in the side of the plug admit the back pressure into the pressure chambers immediately adjacent the vanes to act directly thereon, vents 51 in the enlargement 41 permitting escape of the exhaust fluid. The lower end of the plug extends through and below the bottom of the casing and a disk or cap plate 52 secured thereto and forming the bottom of the pressure chambers, said cap plate having a depending annular rim 53 within which is rotatably fitted a shell 54 having a notched peripheral edge 55 at its lower end, a lug or tooth 56 on the rim 53 engaging in any one of the notches to hold the shell in a set position relative to the rim. The spring 57 is wound around the lower extremity of the plug and secured to the same and to the shell, a nut 58 on the end of the plug coöperating with the spring to prevent withdrawal of the plug from the casing.

Having thus described the invention, what is claimed as new is:

1. A valve comprising a casing, a turning plug therein controlling the flow therethrough, coöperating means on the plug and the casing for setting the plug in a predetermined position and preventing movement of the plug in one direction from said position, means for yieldably holding the plug in said position, and means controlled by the fluid flowing through the casing to move the plug from its set position.

2. A valve comprising a casing, a turning plug mounted therein and controlling the flow therethrough, yieldable means for holding the plug in a set position, means actuated by the fluid flowing through the valve to move the valve from the set position, an arm projecting radially from the upper end of the plug, and a screw mounted on the casing and arranged to bear upon said arm whereby to move the plug to the set position and prevent its movement in one direction from said position.

3. A valve comprising a casing, a turning plug mounted therein and controlling the flow of fluid therethrough, means for setting the plug in a predetermined position, means for moving the plug from the set position under the pressure of the fluid flowing through the casing, a shell connected with the casing and adapted to be rotatably adjusted about the axis of the plug, means for holding the shell in a set position relative to the casing, and a spring housed within the shell and connected with the plug and the shell.

4. A valve comprising a casing having a bore therethrough and provided with a projection on its under side, there being an annular groove in the face of said projection and a port leading from the bore of said casing to said groove, a ring secured to and depending from said projection, a disk closing the lower end of the ring, a turning plug in the casing controlling the flow therethrough, a post rotatably mounted in said projection and said disk concentric with said ring and having its upper end connected to the plug to turn therewith, vanes on said post extending to the ring, radial abutments extending from the ring to the post, said ring being provided with means for admitting fluid from the groove in the projection to the vanes and the disk being provided with means for permitting the escape of said fluid, and a spring connected to the post to yieldably hold the plug in a set position.

5. A valve comprising a casing, a turning plug mounted thereon and controlling the flow therethrough and provided with a lateral projection at its lower end, means for setting the plug in a predetermined position and preventing movement in one direction from said position, a pressure chamber on the side of the casing and in communication with the bore thereof, a post extending centrally through said chamber and provided with a plurality of notches in its upper end to engage the projection on the turning plug whereby to connect the plug and the post for simultaneous rotation and permit annular relative adjustment of the same, means whereby pressure fluid may pass from the bore of the casing to the pressure chamber and act on the post to turn the post and the plug from the set position, and means acting on the post to yieldably hold the same and the plug in the set position.

In testimony whereof I affix my signature.

CHARLES J. OLSON. [L. S.]

Copies of this patent may be obtained for five cents each, by addressing the "Commissioner of Patents, Washington, D. C."